US008286980B2

(12) United States Patent
Onda et al.

(10) Patent No.: US 8,286,980 B2
(45) Date of Patent: Oct. 16, 2012

(54) TRAILING ARM TYPE SUSPENSION (75) Inventors: Kenichi Onda, Shizuoka-ken (JP); Kensuke Ohkubo, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 154 days.

(21) Appl. No.: 12/748,803

(22) Filed: Mar. 29, 2010

(65) Prior Publication Data

US 2010/0244396 A1    Sep. 30, 2010

(30) Foreign Application Priority Data

Mar. 30, 2009 (JP) .................... 2009-081562

(51) Int. Cl.
*B60G 3/14* (2006.01)
(52) U.S. Cl. ........ 280/124.128; 280/124.153; 280/124.1
(58) Field of Classification Search ........... 280/124.109, 280/124.111, 124.128, 124.132, 124.134, 280/124.153, 124.1
See application file for complete search history.

(56) References Cited

U.S. PATENT DOCUMENTS

| | | | |
|---|---|---|---|
| 4,765,647 A * | 8/1988 | Kondo et al. | 280/124.128 |
| 4,989,894 A * | 2/1991 | Winsor et al. | 280/124.109 |
| 5,000,477 A * | 3/1991 | Minakawa et al. | 280/124.136 |
| 5,364,128 A * | 11/1994 | Ide | 280/784 |
| 5,895,063 A * | 4/1999 | Hasshi et al. | 280/124.134 |
| 6,616,161 B2 * | 9/2003 | Hamada et al. | 280/124.149 |
| 6,869,090 B2 * | 3/2005 | Tatsumi et al. | 280/124.109 |
| 7,325,820 B2 * | 2/2008 | Allen et al. | 280/124.15 |
| 7,401,797 B2 * | 7/2008 | Cho | 280/124.128 |
| 7,654,543 B2 * | 2/2010 | Tanaka et al. | 280/124.109 |
| 2005/0140112 A1 * | 6/2005 | Kim | 280/124.143 |

FOREIGN PATENT DOCUMENTS

| | | |
|---|---|---|
| DE | 60222200 T2 | 6/2008 |
| EP | 1245477 A2 | 10/2002 |
| JP | 7050268 A | 11/1995 |
| KR | 20080054828 A | 6/2008 |

OTHER PUBLICATIONS

Shimada et al., Protection Device of Fuel Tank for Vehicle, Nov. 15, 1995, JPO, JP 7-50268 Y, Machine translation of Description.*
Office Action from German Application No. 102010002876 dated Jul. 27, 2011.
Office Action from Chinese Application No. 201010142089.7, dated Nov. 3, 2011.

* cited by examiner

*Primary Examiner* — Ruth Ilan
*Assistant Examiner* — James English
(74) *Attorney, Agent, or Firm* — Lerner, David, Littenberg, Krumholz & Mentlik, LLP (57) ABSTRACT

A trailing arm type suspension improves the handling (driving stability) and the response (driving response) of an automobile by increasing the installation rigidity of a suspension member to a vehicle body frame. In the trailing arm type suspension including a pair of right and left trailing arms which extend in the vehicle longitudinal direction, a reinforcing bar for connecting a suspension member in the vehicle rear side of the trailing arm to a connecting part of a vehicle body frame in the vehicle front side of the suspension member, is disposed between a fuel tank and the trailing arm, and the reinforcing bar and the trailing arm overlap each other as viewed from the side of the vehicle.

7 Claims, 6 Drawing Sheets

TRAILING ARM TYPE SUSPENSION

FIELD OF THE INVENTION

The present invention relates to a trailing arm type suspension including a pair of right and left trailing arms which extend along the vehicle longitudinal direction.

BACKGROUND OF THE INVENTION

Conventionally, in trailing arm suspensions of the above-described type, as described in Japanese Examined Utility Model Application Publication No. 7-50268, a suspension member supporting suspension parts, was merely been installed between right and left side members of a vehicle body frame, which extend in the vehicle longitudinal direction.

BRIEF SUMMARY OF THE INVENTION

According to the above-described conventional feature, the suspension member is merely installed between the paired right and left side members of the vehicle body frame, which extend along the vehicle longitudinal direction. Therefore, the installation rigidity of the suspension member, relative to the vehicle body frame, cannot be increased sufficiently, so that it has been difficult to improve the handling (driving stability) and the response (driving response) of an automobile.

Accordingly, an object of the present invention is to provide a trailing arm type suspension capable of improving the handling (driving stability) and the response (driving response) of an automobile by increasing the installation rigidity of a suspension member relative to a vehicle body frame. Furthermore, another object of the present invention is to provide a trailing arm type suspension capable of protecting a fuel tank.

In a first aspect of the present invention, there is provided a trailing arm type suspension including a pair of right and left trailing arms which extend in the vehicle longitudinal direction, wherein the pair of right and left trailing arms are individually disposed on both right and left sides of a fuel tank;

a reinforcing bar for connecting a suspension member in the vehicle rear side of the trailing arm to a connecting part of a vehicle body frame in the vehicle front side of the suspension member is disposed between the fuel tank and the trailing arm; and the reinforcing bar and the trailing arm overlap as viewed from the side of the vehicle.

According to this feature, the reinforcing bar for connecting the suspension member in the vehicle rear side of the trailing arm to the connecting part of the vehicle body frame in the vehicle front side of the suspension member, is disposed between the fuel tank and the trailing arm. Therefore, the installation rigidity of the suspension member relative to the vehicle frame body, can be increased sufficiently, so that the handling (driving stability) and the response (driving response) of the automobile, can be improved.

Furthermore, the rigidity around the fuel tank can be increased by utilizing the reinforcing bar without increasing the number of parts, and therefore the fuel tank can be protected by reducing the deformation of the fuel tank.

The reinforcing bar and the trailing arm overlap as viewed from the side of the vehicle. Therefore, even if the trailing arm is deformed to the fuel tank side by the application of an impact load (impact force), the reinforcing bar can receive the trailing arm so as to regulate the movement of the trailing arm to the fuel tank side.

In addition, the movement of the trailing arm to the fuel tank side is regulated by the reinforcing bar, which is separated from the trailing arm. Therefore, for example, compared with a feature for reinforcing the trailing arm to regulate the movement of the trailing arm to the fuel tank side, the movement of the trailing arm can be regulated reliably, and furthermore the reduction in weight, and the improvement in suspension performance (the improvement in the following capability of the suspension by the reduction in weight under spring), can be achieved.

In another aspect of the present invention, if, in a longitudinal cross section perpendicular to the vehicle longitudinal direction, the length in the up and down direction of the trailing arm, is longer than the length in the right and left direction of the trailing arm, when the trailing arm is deformed to the fuel tank side by the application of an impact load, the reinforcing bar can receive the trailing arm easily, so that the movement of the trailing arm to the fuel tank side, can be regulated more surely.

In another aspect of the present invention, if a kick up part which is disposed so as to rise toward the vehicle rear side, is provided in each of a pair of right and left side members of the vehicle body frame, and the right and the left side members are disposed under a floor so as to extend along the vehicle longitudinal direction;

the connecting part is provided in the lower end portion of the kick up part, and the front end portion of the reinforcing bar which is connected to the connecting part is disposed on the vehicle front side of the front end portion of the trailing arm;

the reinforcing bar is set in a substantially horizontal posture along the vehicle longitudinal direction; and the rear end portion of the reinforcing bar is attached to the lower end portion of a mounting bolt for mounting the suspension member to the side member in the up and down direction, the advantageous effects described below can be achieved.

The front end portion of the reinforcing bar is disposed in the vehicle front side of the front end portion of the trailing arm. Therefore, the reinforcing bar can be disposed in a wider range in the vehicle longitudinal direction relative to the trailing arm, so that the movement of the trailing arm to the fuel tank side, can be regulated more reliably by the reinforcing bar.

Furthermore, the reinforcing bar is disposed in the substantially horizontal direction so as to be continuous from the rear end of a portion of the side member, which extends along the vehicle longitudinal direction, to the side member which relates to this portion. Therefore, an impact load can be transmitted effectively in the vehicle longitudinal direction via the reinforcing bar, so that the rigidity of the vehicle body can be increased.

The rear end portion of the reinforcing bar is attached to the lower end portion of the mounting bolt. Therefore, the installation rigidity of the suspension member to the side member can be increased. The rigidity of suspension parts attached to the suspension member can be increased. Furthermore, the handling (driving stability) and the response (driving response) of the automobile are improved, and thereby the quality of commodities can be increased.

In another aspect of the present invention, if a rubber bush including an internal cylinder and a rubber form an elastic body which is vulcanized and adhered to the outer peripheral surface of the internal cylinder, is pressed into a vertical hole formed in the suspension member; and the side member, the internal cylinder, and the rear end portion of the reinforcing bar are connected to one another by the mounting bolt inserted through the internal cylinder so as to install the rear end portion of the reinforcing bar to the lower end portion of the mounting bolt, the advantageous effects described below can be achieved.

For example, regarding a feature configured merely by pressing the rubber bush including the internal cylinder and the rubber form elastic body which are vulcanized and adhered to the outer peripheral surface of the internal cylinder, into the vertical hole which is formed in the suspension member, and by connecting the side member and the internal cylinder to each other by the mounting bolt which is inserted through the internal cylinder, the mounting bolt may fall down because of an external force applied to the suspension.

On the other hand, according to the above-described feature of the present invention, the side member, the internal cylinder, and the rear end portion of the reinforcing bar are connected to one another by the mounting bolt which is inserted through the internal cylinder, and the rear end portion of the reinforcing bar is attached to the lower end portion of the mounting bolt. Both ends of the mounting bolt can be supported, so that the mounting bolt can be less liable to fall down.

As a result, the installation rigidity of the suspension member to the side member can be increased, and furthermore the rigidity of suspension parts which are attached to the suspension member, can be increased. Therefore, the handling (driving stability) and the response (driving response) of the automobile are improved, and thereby the quality of products can be increased.

In another aspect of the present invention, if a suspension member mounting bracket is formed in a side member part of the side member from the kick up part toward the vehicle rear side, so as to expand downward; and the suspension member is connected to the suspension member mounting bracket from the downside via the rubber bush, the advantageous effects described below can be achieved.

The suspension member is connected to the suspension member mounting bracket from the downside via the rubber bush. Therefore, the space, in the up and down direction between the side member part and the suspension member, can be prevented from narrowing.

In addition, as viewed from the side of the vehicle, the opening in the vehicle rear side of the kick up part of the side member, is surrounded by the kick up part, the suspension member mounting bracket, a portion around the vertical hole in the suspension member (for example, a vertical cylinder), and the reinforcing bar. Thereby, the opening can be formed relatively small and substantially triangular. Therefore, the movement and passage of the trailing arm to the fuel tank side can be difficult by the rigidity of the surrounding frame itself and the small opening area.

In another aspect of the present invention, if a longitudinal intermediate portion of the reinforcing bar is formed of a metallic pipe material, the front end portion and the rear end portion of the reinforcing bar are formed by metallic attachment plates, and both the attachment plates are welded to both end portions of the metallic pipe material individually, the feature of the reinforcing bar can be made simple, and the weight thereof can be reduced. Furthermore, the reinforcing bar can be manufactured easily, so that the productivity can be improved.

In another aspect of the present invention, if the longitudinal intermediate portion of the reinforcing bar is bent into a chevron shape which is convex to the outside in the vehicle width direction, when an impact load is applied from the outside of the vehicle width direction, the reinforcing bar can be less liable to be deformed to the fuel tank side in the inside of the vehicle width direction.

Therefore, the present invention can provide the trailing arm type suspension capable of improving the handling (driving stability) and the response (driving response) of the automobile by increasing the installation rigidity of the suspension member relative to the vehicle body frame.

DETAILED DESCRIPTION OF THE INVENTION

An embodiment of the present invention will now be described with reference to the accompanying drawings.

Feature of Vehicle Body Frame 1

Figure 1:
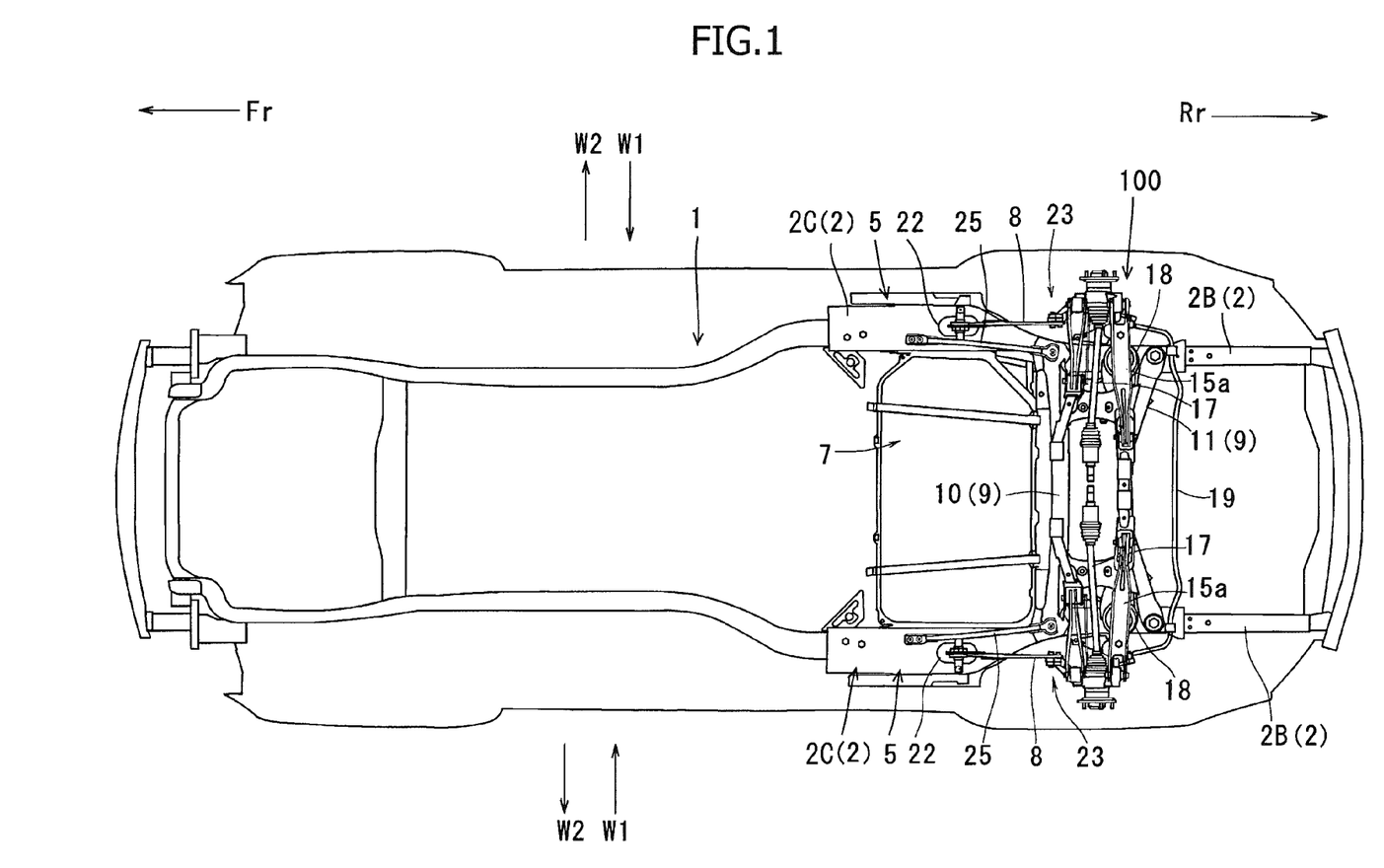
FIG. 1 is a bottom view of an automobile.
Figure 2:
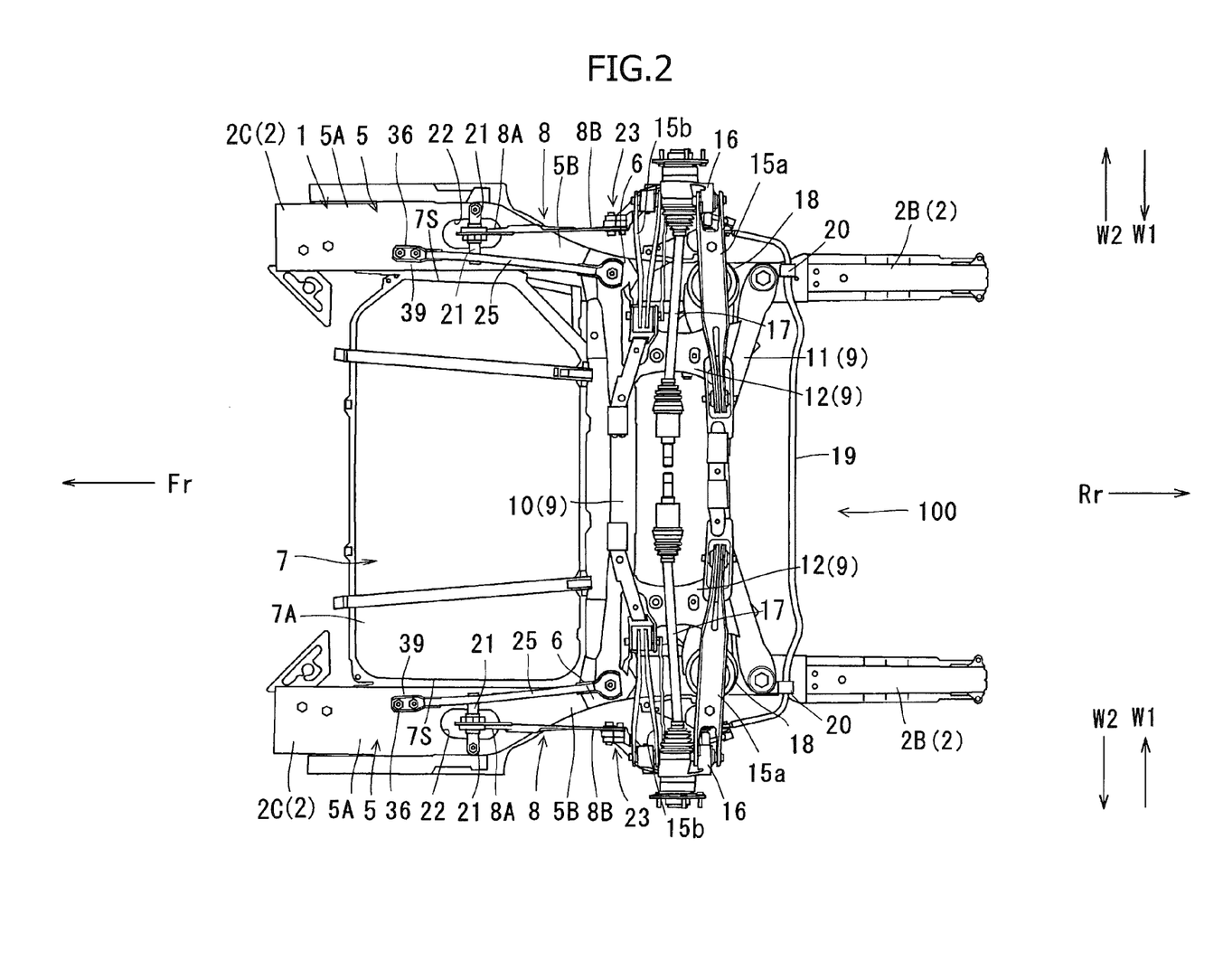
FIG. 2 is a bottom view of a trailing arm type suspension of the automobile shown in FIG. 1.
Figure 3:
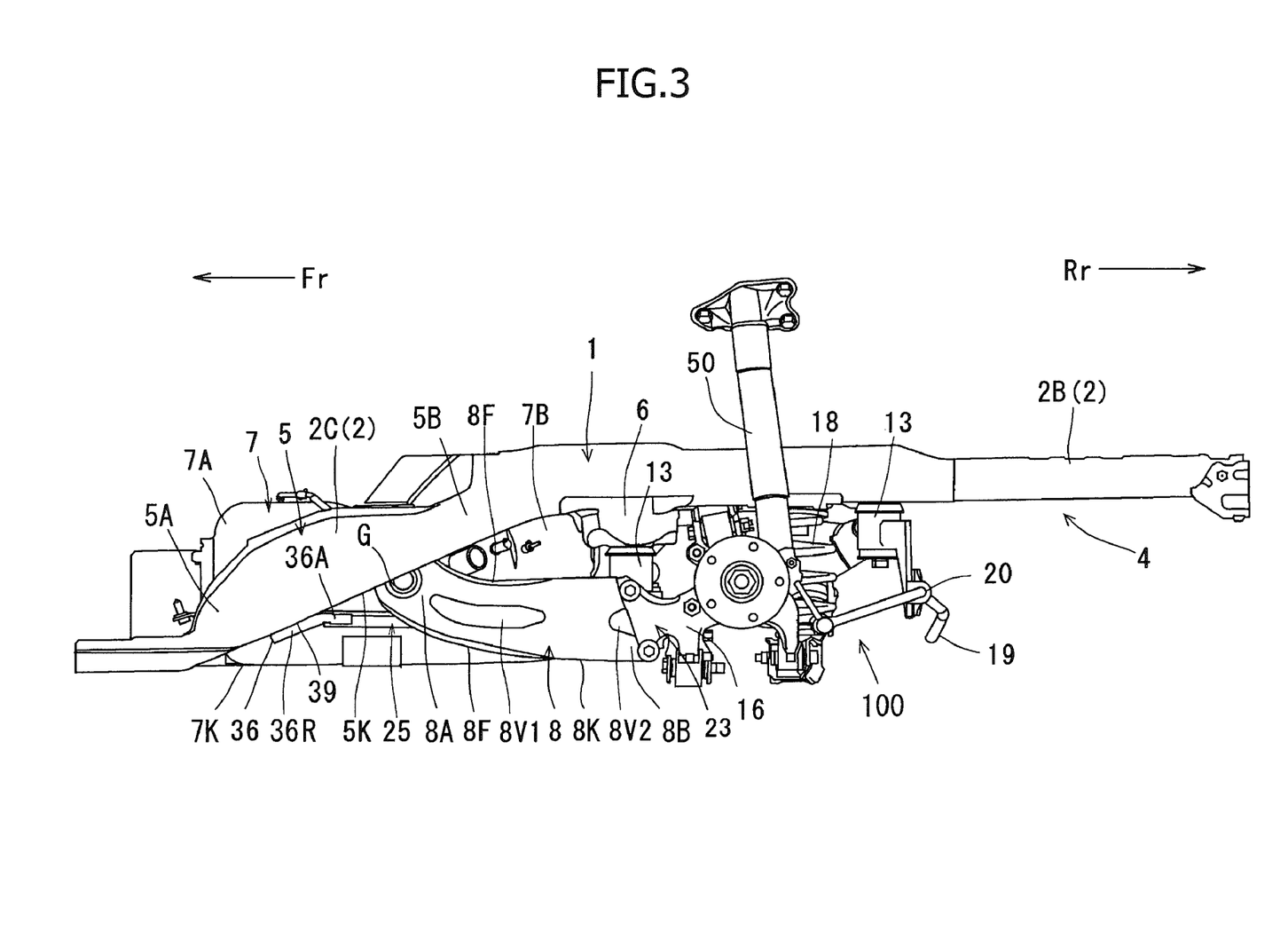
FIG. 3 is a side view of the trailing arm type suspension viewed from the right side of a vehicle body.

FIGS. 1 to 3 show a trailing arm type suspension of an automobile. As shown in FIGS. 1 to 3, a vehicle body frame 1 includes a pair of right and left side members 2 extending along the vehicle longitudinal direction, and a plurality of cross members installed between the side members 2. The side members 2 and the cross members are disposed under a floor 4 of the lower part of a floor panel, and are formed so as to have a longitudinal cross section of a that shape which has the opened upper side. A pair of right and left flanges in the upper end portion of each of the side members 2 and the cross members are welded to the lower surface of the floor panel.

A longitudinal intermediate portion 2C (in particular, a portion located from a rear wheel toward the vehicle front side Fr in a vehicle rear half part of the side member 2) of the side member 2 expands to the outside W2 in the vehicle width direction, so that the distance between the longitudinal intermediate portions 2C of the paired right and left side members 2 increases. Under the floor 4 between the paired right and left longitudinal intermediate portions 2C, a fuel tank formed in a rectangular parallelepiped shape which is long in the vehicle width direction, is disposed. A left side surface 7S of the fuel tank 7 is close to the left side member 2, and the right side surface 7S of the fuel tank 7 is close to the right side member 2.

A rearward rising kick up part 5 which is disposed so as to rise toward the vehicle rear side Rr, is provided with each of the longitudinal intermediate portions 2C of the paired right and left side members 2, which are disposed under the floor 4 in a state of extending along the vehicle longitudinal direction. A pair of right and left side member portions 2B in the vehicle rear side Rr of the kick up parts 5, are extended horizontally from the upper end portions of the kick up parts 5, are disposed in parallel each other, and are disposed at the same positions in the vertical direction as the upper end portions of the kick up parts 5.

The distance between the side surfaces on the inside W1 in the vehicle width direction of the paired right and left side member parts 2B, is shorter than the width in the right and left direction of the fuel tank 7. In the end portion in the vehicle front side Fr of the side member part 2B, a suspension frame mounting bracket 6 which has a bottom and is formed cylindrical (corresponding to a suspension member mounting bracket, refer to FIGS. 3 and 5), is formed so as to expand downward.

A front end portion 7A in the vehicle front side Fr of the fuel tank 7 and front end portions 5A in the vehicle front side Fr of the kick up parts 5, are disposed at almost the same position in the vehicle longitudinal direction. A rear end portion 7B in the vehicle rear side Rr of the fuel tank and the rear end portions 5B in the vehicle rear side Rr of the kick up parts 5, are disposed at almost the same position in the vehicle longitudinal direction.

A trailing arm type suspension 100 is disposed so as to range from the outsides in the right and left direction of the fuel tank 7 to the rear side of the fuel tank 7. This trailing arm type suspension 100 includes a pair of right and left trailing arms 8 extending in the vehicle longitudinal direction, and is configured so as to be symmetrical in the right and left direction with respect to the vehicle centerline. The trailing arm 8 is formed of a metallic plate.

Feature of Trailing Arm Type Suspension 100

As shown in FIGS. 2 to 5, a front frame 10 and a rear frame 11 of a suspension frame 9 (corresponding to a suspension member) formed in a well curb shape which is long in a vehicle width direction, are installed between the paired right and left side member parts 2B in the rear of the kickup part 5.

Both of the front frame 10 and the rear frame 11 are formed of a cylindrical metallic pipe material. The front frame 10 is bent into an arcuate shape which is convex to the vehicle rear side Rr. The rear frame 11 is bent more greatly than the front frame 10 into an arcuate shape which is convex to the vehicle front side Fr. A pair of right and left connecting frames 12 for connecting the front frame 10 and the rear frame 11 to each other, are formed so as to be wide in the vehicle width direction. Both the end parts in the vehicle longitudinal direction thereof are disposed so as to be wider than the central parts in the vehicle longitudinal direction thereof.

Figure 5:
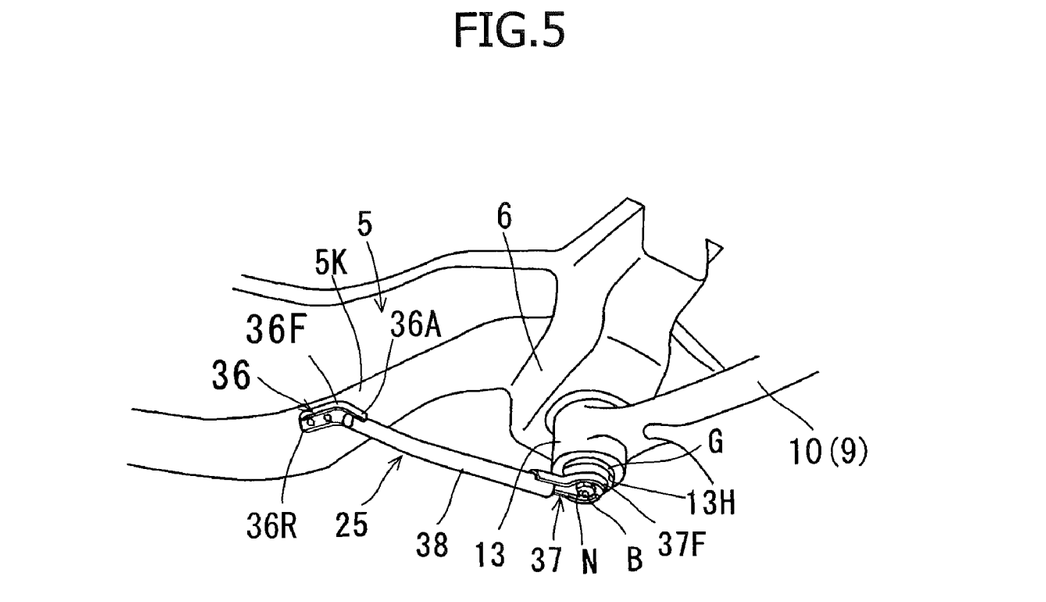
FIG. 5 is a perspective view showing the attachment structure of the reinforcing bar.

To both the right and left end portions of the front frame 10 and both the right and left end portions of the rear frame 11, the outer peripheral surfaces of vertical cylinders 13 are welded. As shown in FIGS. 2 and 5, a rubber bush G which is composed of an internal cylinder, an external cylinder, and a rubber form elastic body for connecting these cylinders, is pressed into a vertical hole 13H in the vertical cylinder 13. A mounting bolt B which projects from the lower wall of the side member part 2B, or the lower wall of the suspension frame mounting bracket 6, is inserted through the internal cylinder of the rubber bush G. A nut N is threaded and engaged with the lower end portion of the mounting bolt B. This connecting structure will be explained later in more detail.

The suspension frame 9 supports knuckles 16 via a plurality of arms 15a and 15b which extend along the vehicle right and left direction in a plan view, so as to allow the knuckles 16 to be swayed vertically around the axes along the vehicle longitudinal direction. Rubber bushes, each of which is composed of an internal cylinder, an external cylinder, and a rubber form elastic body for connecting these cylinders, are interposed between one end portion of the arm 15a, 15b and the knuckle 16, and are interposed between the other end portion of the arm 15a, 15b and the suspension arm 9.

Reference numeral 17 denotes an axle. One end part of the outside W2 in the vehicle width direction of the axle 17 penetrates the knuckle 16. A coil spring 18 is interposed between the lower arm 15a of the plurality of arms 15a and 15b for connecting the knuckle 16 to the suspension frame 9 and the lower surface of the side member part 2B. Reference numeral 19 denotes a stabilizer bar, reference numeral 20 denotes a stabilizer bush which is fixed to the lower surface of the side member part 2B to insert and support the stabilizer bar 19, and reference numeral 50 in FIGS. 3 and 4 denotes a shock absorber.

Feature of Trailing Arm 8

As shown in FIGS. 1 and 2, the paired right and left trailing arms 8 are disposed individually in both right and left sides of the fuel tank 7. As shown in FIG. 3, the trailing arm 8 is molded into a wide J shape which is directed to the upward direction, so that a front end portion 8A in the vehicle front side Fr of the trailing arm 8 is disposed above a rear end portion 8B in the vehicle rear side Rr thereof. Furthermore, in a longitudinal cross section perpendicular to the vehicle longitudinal direction, the length in the up and down direction of the trailing arm 8 is longer than the length in the right and left direction of the trailing arm 8.

A lower surface 8K in the vehicle rear side Rr of the trailing arm 8 is disposed at almost the same position in the vertical direction as a horizontal lower surface 7K of the fuel tank 7. Each of the lengths in the up and down direction of the front half part on the vehicle front side Fr of the trailing arm 8 and the rear half part on the vehicle rear side Rr thereof, is substantially a half of the length in the up and down direction of the fuel tank 7. Both of the upper and lower end portions of the front half part of the trailing arm 8 are bent to the outside W2 in the vehicle width direction so as to form flanges 8F. In an intermediate portion in the up and down direction of the front half part of the trailing arm 8, a first bead 8V1 which extends to the vehicle front side Fr, is formed in a state of expanding to the outside W2 in the vehicle width direction. In an intermediate portion in the up and down direction of the rear end portion 8B of the trailing arm 8, a second bead 8V2 which expands to the outside W2 in the vehicle width direction, is formed. By this feature, the rigidity of the trailing arm 8 is increased.

Therefore, the front end portion 8A of the trailing arm 8 is disposed above (above slantwise forward) the rear end portion 8B of the trailing arm 8. The front end portion 8A is attached to lower surface 5K of the central part which tilts rearward and upward in the vehicle longitudinal direction of the kick up part 5, via a rubber bush G has the axis extending along the vehicle width direction (the right and left direction of vehicle) so as to allow the trailing arm 8 to be swayed around the transverse axis. The front end portion 8A of the trailing arm 8 is disposed in the outside W2 in the vehicle width direction in a central part in the vehicle longitudinal direction of the fuel tank 7.

Figure 7:
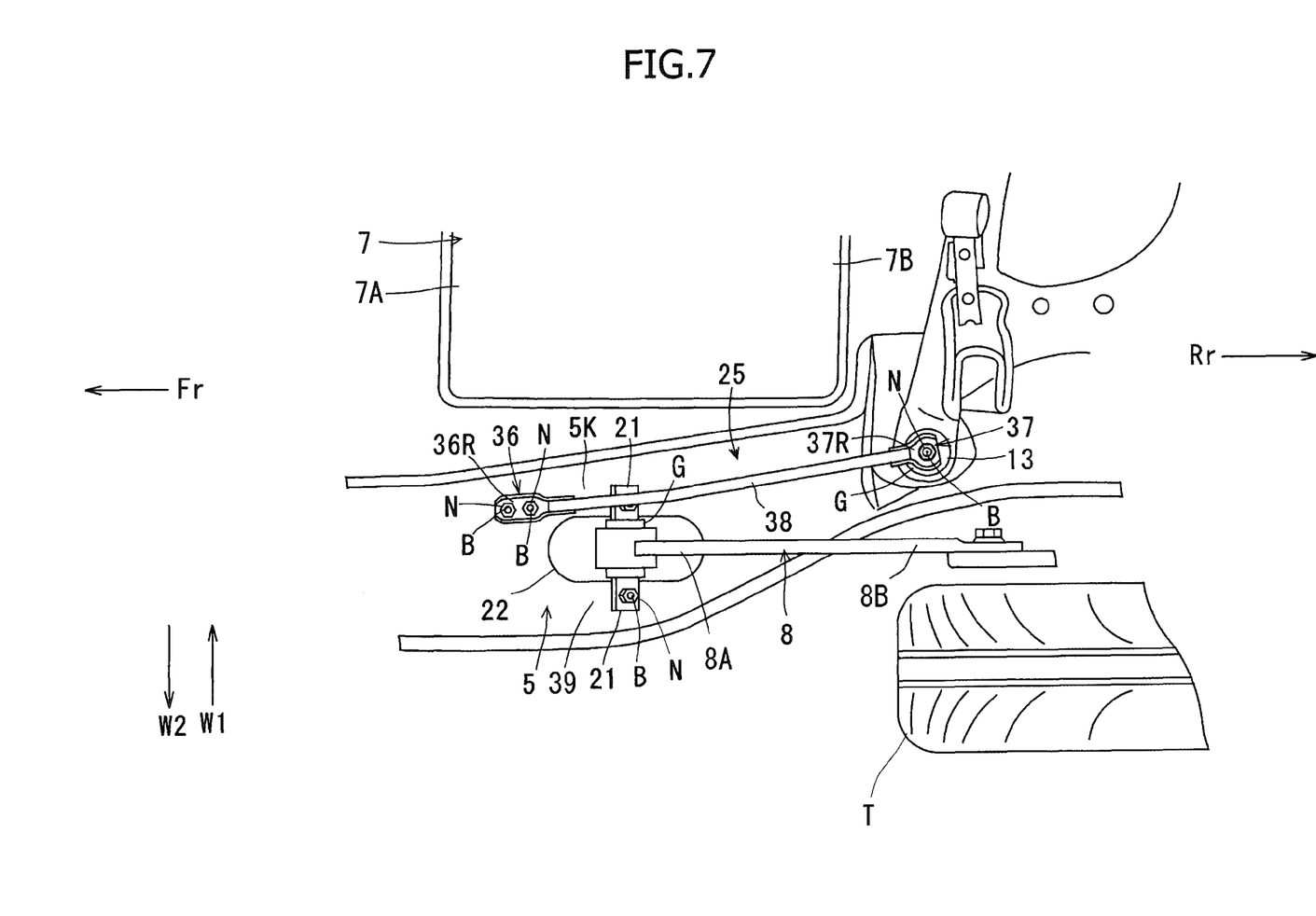
FIG. 7 is a bottom plan view of an attachment structure of a trailing arm to the reinforcing bar.

The rubber bush G which is interposed between the front end portion 8A of the trailing arm 8 and the lower surface 5K of the central part which tilts rearward and upward in the vehicle longitudinal direction of the kick up part 5, includes an axis member, an external cylinder allowing the axis member to be inserted through, and a rubber form elastic body for connecting these elements to each other. A pair of right and left mounting flanges 21 are formed in both end portions of the axis member. As shown in FIG. 7, the rubber bush G is inserted under pressure into a transverse hole in the front end portion 8A of the trailing arm 8. Both of the mounting flanges 21 are lapped in the lower surface 5K of the kick up part 5 which tilts rearward and upward. A mounting bolt B is inserted through a bolt insertion hole in the lower surface 5K and the mounting flange 21. A nut N is threaded and engaged with the mounting bolt B. On the lower surface of the kick up part 5 between the mounting flanges 21, a concave part 22 which is long in the vehicle longitudinal direction, is formed so as to receive the rubber bush G and the front end portion 8A of the trailing arm 8. Symbol T in FIG. 7 denotes a rear wheel.

The rear end portion 8B of the trailing arm 8 is attached to an attachment part 23 of the knuckle 16 via a pair of upper and lower rubber bushes which have the axis extending in the vehicle width direction. This attachment part 23 is composed of a pair of upper and lower transverse holes. The upper transverse hole is disposed in the vehicle front side Fr (slightly vehicle front side Fr) of the lower transverse hole. Each of these rubber bushes is composed of an internal cylinder, external cylinder, and a rubber form elastic body for connecting these cylinders.

The paired upper and lower rubber bushes are pressed individually into the upper and lower transverse holes. A mounting bolt is inserted into the internal cylinder of the rubber bush. A nut is threadedly engaged with the mounting bolt. Thereby, the rear end portion 8B of the trailing arm 8 is attached to the knuckle 16 so as to allow the trailing arm 8 to be swayed around the transverse axis. The trailing arm 8 sways which resisting an elastic force of the rubber form elastic body of the rubber bush G.

Feature of Reinforcing Bar 25

As shown in FIGS. 1, 2, and 5 to 7, a pair of right and left reinforcing bars 25, each of which connects the suspension frame 9 in the vehicle rear side Rr of the trailing arm 8 to a connecting part 39 of the side member 2 in the vehicle front side Fr of the suspension frame 9, are disposed independently between the left side surface 7S of the fuel tank 7 and the left side training arm 8 and between the right side surface 7S of the fuel tank 7 and the right side training arm 8. As shown in FIG. 3, the reinforcing bar 25 and the trailing arm 8 overlap each other as viewed from the side of the vehicle. The space in the vehicle width direction between the reinforcing bar 25 and the fuel tank 7 is shorter than the space in the vehicle width direction between the reinforcing bar 25 and the training arm 8 (refer to FIG. 2).

Each of the reinforcing bars 25 tilts (slightly tilts) so that the front end portion side thereof is located in the outside W2 in the vehicle width direction, so that the paired right and left reinforcing bars 25 tilt so as to spread toward the front in plan view. Furthermore, a U-shaped frame, the vehicle front side Fr of which is open in plan view, is formed by the paired right and left reinforcing bars 25 and the front frame 10 of the suspension frame 9. This U-shaped frame surrounds the fuel tank 7 from the vehicle rear side Rr.

Figure 6:
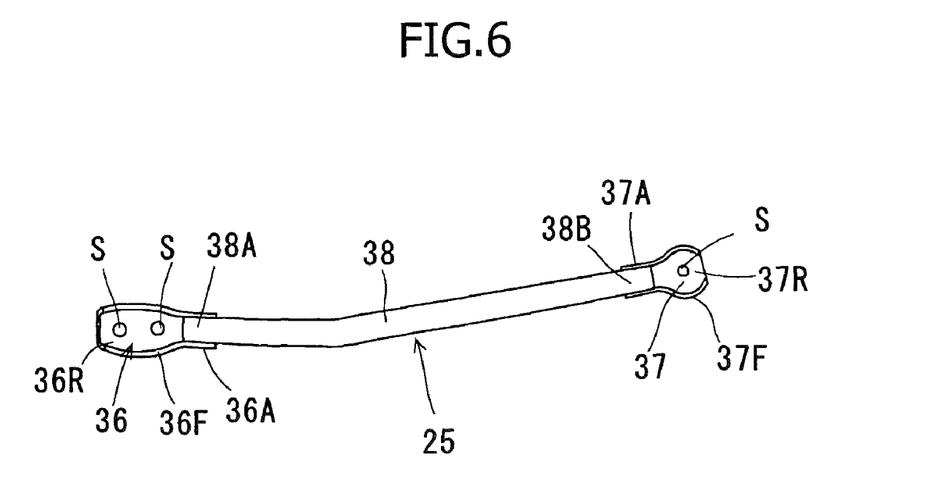
FIG. 6 is a bottom view of the reinforcing bar.

The reinforcing bar 25 is explained in more detail below. As shown in FIGS. 5 to 7, the longitudinal intermediate portion of the reinforcing bar 25 is formed of a cylindrical metallic pipe material 38. The front end portion and the rear end portion of the reinforcing bar 25 are formed by metallic attachment plates 36 and 37, respectively. Furthermore, one end portion 36A, 37A of the attachment plate 36, 37 is welded to an end portion 38A, 38B of the pipe material 38.

The front attachment plate 36 forming the front end portion of the reinforcing bar 25 is attached to the lower end portion of the kick up part 5 of the vehicle body frame 1, and the rear attachment plate 37 forming the rear end portion of the reinforcing bar 25 is attached to the lower end portion of the mounting bolt B for vertically connecting the front frame 10 of the suspension frame 9 to the side member part 2B.

The front attachment plate 36 is formed into a rectangular shape which is long in the longitudinal direction of the reinforcing bar 25. A reinforcing flange 36F rising to the side opposite to the direction in which the front attachment plate 36 is attached to the side member part 2B of the vehicle body frame 1 (the lower side), is formed in the outer peripheral part of the front attachment plate 36. In addition, the front attachment plate 36 is formed with a plurality of bolt insertion holes S located at intervals in the longitudinal direction.

One end portion 36A of the front attachment plate 36 is bent so as to have a U-shaped cross section, the lower side of which is open. The one end portion 36A is installed at one end portion 38A of the pipe material 38 from the side member part 2B side (the upper side), and is welded thereto. As shown in FIGS. 3 and 5, a first connecting part 36R of the front attachment plate 36, which includes the bolt insertion holes S, is bent and tilted downward with respect to the one end portion 36A which has a U-shaped cross section of the front attachment plate 36.

Regarding the rear attachment plate 37, one side in the longitudinal direction thereof is formed into a disk which is shaped as second connecting part 37R. A reinforcing flange 37F rising to the side opposite to the direction in which the rear attachment plate 37 is attached to the lower end portion of the mounting bolt B (the lower side), is formed in the outer peripheral part thereof. One bolt insertion hole S is formed in the disk shaped second connecting part 37R of the rear attachment plate 37. The other end portion 37A in the longitudinal direction of the rear attachment plate 37 is bent so as to have a U-shaped cross section, the lower side of which is open. The other end portion 37A is installed to the other end portion 38B of the pipe material 38 from the upside, and is welded thereto.

Since the reinforcing bar 25 is configured as described above, the feature of the reinforcing bar 25 can be made simple, and the weight of the reinforcing bar 25 can be reduced. Furthermore, the reinforcing bar 25 can be manufactured easily, so that the productivity can be improved.

The longitudinal intermediate portion of the reinforcing bar 25 (the longitudinal intermediate portion of the pipe material 38) is bent into a chevron shape which is convex to the outside W2 in the vehicle width direction. Thereby, the reinforcing bar 25 can be less liable to be deformed to the fuel tank 7 side on the inside W1 in the vehicle width direction, when an impact load is applied from the outside W2 in the vehicle width direction.

As shown in FIGS. 2, 3 and 7, the connecting part 39 is provided on the lower surface 5K of the lower end portion of the kick up part 5, which tilts rearward and upward. The front attachment plate 36 overlaps the connecting part 39 of the lower surface 5K. The paired front and rear mounting bolts B, which penetrates the connecting part 39, are individually inserted through the paired front and rear bolt insertion holes S in the front attachment plate 36. Nuts N are threaded and engaged with the mounting bolts B, whereby the front attachment plate 36 is attached and fixed to the lower surface 5K. Thereby, the front attachment plate 36 of the reinforcing bar 25 which is connected to the connecting part 39, is disposed at a front and lower position in the vehicle front side Fr of the front end portion 8A of the trailing arm 8.

Furthermore, the reinforcing bar 25 is set in a substantially horizontal posture along the vehicle longitudinal direction, and the rear attachment plate 37 of the reinforcing bar 25 is attached to the lower end portion of the mounting bolt B that attaches the suspension frame 9 to the side member part 2B in the up and down direction.

That is to say, as described above, the rubber bush G is pressed into the vertical cylinder 13 which is provided with the front frame 10 of the suspension frame 9. The second connecting part 37R of the rear attachment plate 37 of the reinforcing bar 25 overlaps the lower end surface of the internal cylinder from the downside. The mounting bolt B, which is provided with the side member part 2B, is inserted through the internal cylinder of the rubber bush G and the bolt insertion hole S in the second connecting part 37R of the rear attachment plate 37. The nut N is threaded and engaged with the lower end portion of the mounting bolt B.

Thereby, the side member part 2B, the internal cylinder, and the rear attachment plate 37 of the reinforcing bar 25 are connected to one another by the mounting bolt B which is inserted through the internal cylinder. Thereby, the rear attachment plate 37 of the reinforcing bar 25 is attached to the lower end portion of the mounting bolt B.

For example, a structure is configured merely by pressing the rubber bush G into the vertical cylinder 13 provided on the front frame 10 of the suspension frame 9, by inserting the mounting bolt B provided in the side member part 2B through the internal cylinder of the rubber bush G, and by threading and engaging the nut N with the lower end portion of the mounting bolt B, so that the mounting bolt B may fall down because of an external force applied to the suspension 100.

On the other hand, according to the above-described feature of the present invention, the second connecting part 37R of the rear attachment plate 37 of the reinforcing bar 25 is attached to the lower end portion of the mounting bolt B. Therefore, the mounting bolt B can be supported at two places, so that the mounting bolt B can be less liable to fall down.

As a result, the installation rigidity of the suspension frame 9 to the vehicle body frame 1 can be increased, and furthermore the rigidity of parts of the suspension 100 which are attached to the suspension frame 9, can be increased. Therefore, the handling (driving stability) and the response (driving response) of the automobile are improved, and thereby the quality of commodities can be increased.

In addition, the reinforcing bar 25 is disposed in the substantially horizontal direction so as to be continuous, from the rear end of a portion of the side member 2, which extends along the vehicle longitudinal direction, to the side member 2 which relates to this portion. Therefore, an impact load can be transmitted effectively in the vehicle longitudinal direction via the reinforcing bar 25, so that the rigidity of vehicle body can be increased.

Figure 4:
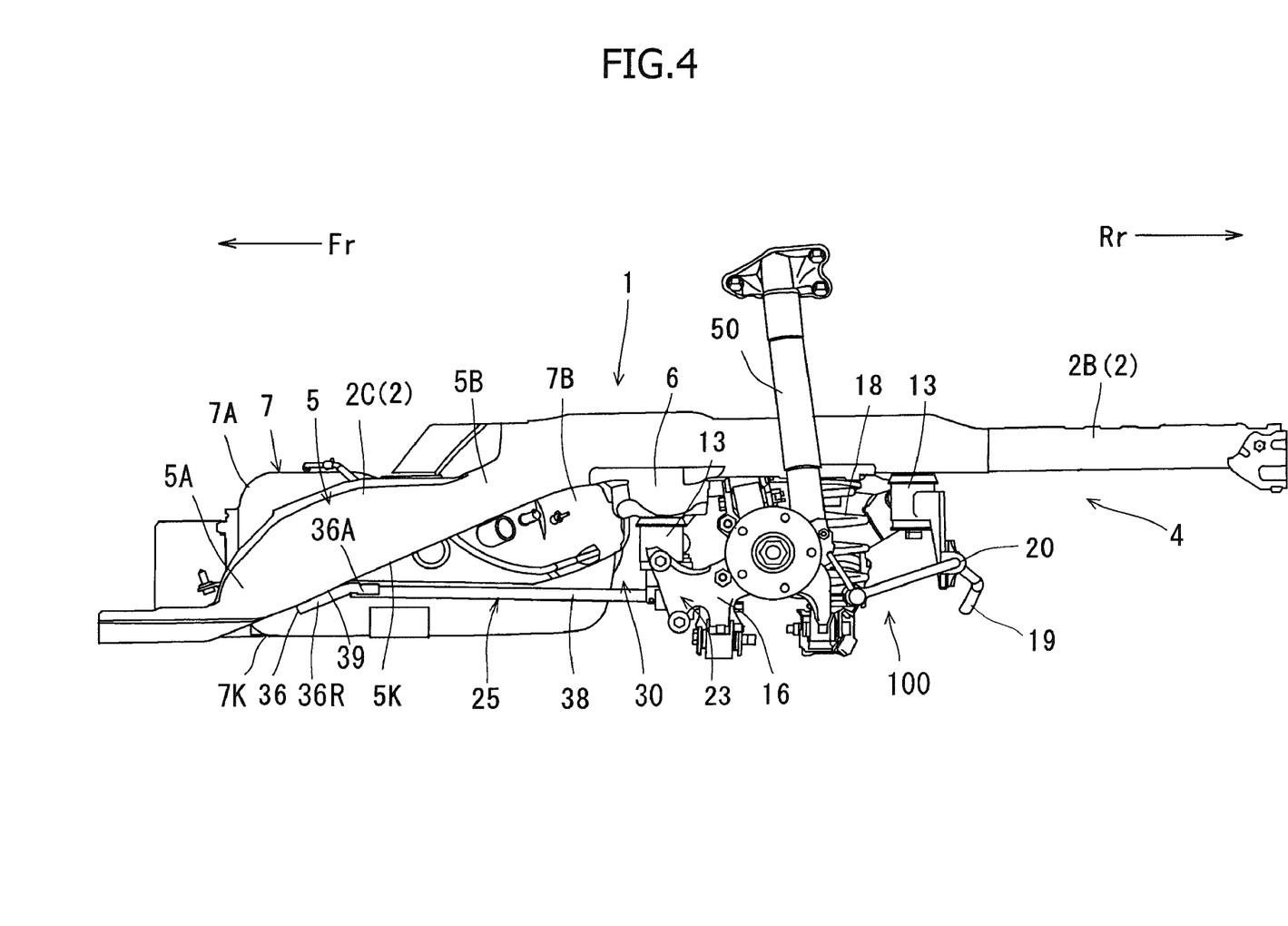
FIG. 4 is a side view of the trailing arm type suspension viewed from the right side of a vehicle body, which shows an attachment structure of a reinforcing bar.

As shown in FIG. 4, in the state in which the reinforcing bar 25 is installed, the reinforcing bar 25 is disposed below (slightly below) the center in the up and down direction of the fuel tank 7. The front attachment plate 36 of the reinforcing bar 25 is disposed in the outside W2 in the vehicle width direction of the front end portion 7A of the fuel tank 7. Furthermore, as shown in FIGS. 3 and 7, the rear end portion 8B of the trailing arm 8 and the rear attachment plate 37 of the reinforcing bar 25 are disposed in the vehicle rear side Rr of the rear end portion 7B of the fuel tank 7, and are disposed at almost the same position in the up and down direction of the vehicle.

By the above-described feature, the installation rigidity of the suspension frame 9 can be increased by the reinforcing bar 25, and the rigidity around the fuel tank 7 can be increased without increasing the number of parts. Therefore, the fuel tank 7 can be protected by reducing the deformation of the fuel tank 7.

In addition, when the trailing arm 8 is deformed to the fuel tank 7 side by an impact load, the reinforcing bar 25 receives the trailing arm 8 from the inside W1 in the vehicle width direction, so that the trailing arm 8 can be prevented from coming into contact with the fuel tank 7.

The movement of the trailing arm 8 to the fuel tank 7 side is regulated by the reinforcing bar 25, which is a member separate from the trailing arm 8. Therefore, the movement can be regulated effectively. Compared to a method for reinforcing the trailing arm 8, the reduction in weight and the improvement in suspension performance (the improvement in the following capability of the suspension 100 by the reduction in weight under spring) can be achieved.

Furthermore, in the longitudinal cross section perpendicular to the vehicle longitudinal direction, the length in the up and down direction of the trailing arm 8 is longer than the length in the right and left direction of the trailing arm 8. Therefore, the reinforcing bar 25 can receive the trailing arm 8 more reliably to regulate the movement of the trailing arm 8 to the fuel tank 7 side.

In addition, as shown in FIG. 4, as viewed from the side of the vehicle, the opening on the vehicle rear side Rr of the kick up part 5 of the side member 2 is surrounded by the kick up part 5, the suspension frame mounting bracket 6, the vertical cylinder 13 of the suspension frame 9, and the reinforcing bar 25 to form a relatively small and substantially triangular opening 30. By this feature, it is difficult to move and to pass the trailing arm 8 to the fuel tank 7 side by the rigidity of the surrounding frame itself and the small opening area.

The front attachment plate 36 of the reinforcing bar 25 is disposed in the vehicle front side Fr of the front end portion 8A of the training arm 8. Therefore, the reinforcing bar 25 can be disposed in a wider range in the vehicle longitudinal direction with respect to the trailing arm 8, so that the movement of the trailing arm 8 to the fuel tank 7 side can be regulated more reliably by the reinforcing bar 25.

As described above, the rear end portion 8B of the trailing arm 8 and the rear attachment plate 37 of the reinforcing bar 25 are disposed in the vehicle rear side Rr of the rear end portion 7B of the fuel tank 7, and are disposed at almost the same position in the up and down direction of the vehicle. Furthermore, the front attachment plate 36 of the reinforcing bar 25 which is connected to the connecting part 39, is located at a front and lower position in the vehicle front side Fr of the front end portion 8A of the trailing arm 8. Therefore, when an impact load is applied from the vehicle rear side Rr, the operation described below is performed.

When an impact load is applied from the vehicle rear side Rr, the rear end portion of the vehicle body is frequently raised up. Therefore, the rear end portion of the trailing arm 8 is disposed below the rear end portion of the reinforcing bar 25, and the trailing arm 8 and the reinforcing bar 25 are located so as to intersect with each other as viewed from the side of the vehicle. Thereby, the movement of the trailing arm 8 to the fuel tank 7 side can be regulated more reliably by the reinforcing bar 25.

What is claimed is:

1. A trailing arm type suspension for a vehicle having a vehicle longitudinal direction and a vehicle lateral direction, the vehicle longitudinal direction defining forward and rearward directions with respect to the vehicle, and the vehicle lateral direction defining left and right directions with respect to the vehicle, the trailing arm type suspension comprising a pair of right and left trailing arms which extend in the vehicle longitudinal direction, wherein:

the pair of right and left trailing arms are individually disposed on respective right and left sides of a fuel tank;

on at least one of the left and right sides of the fuel tank, a reinforcing bar for connecting a suspension member to a connecting portion of a vehicle body frame is disposed between the fuel tank and the respective trailing arm, the suspension member being positioned rearwardly of the respective trailing arm, and the connecting portion of the vehicle body frame being positioned forwardly of the suspension member; and on the at least one of the left and right sides of the fuel tank, the reinforcing bar and the respective trailing arm are arranged side by side at substantially the same height, and the reinforcing bar and the respective trailing arm overlap each other as viewed in the lateral direction.

2. The trailing arm type suspension according to claim 1, wherein, on the at least one of the left and right sides of the fuel tank, in a longitudinal cross section perpendicular to the vehicle longitudinal direction, a length of the respective trailing arm in a vertical direction of the vehicle is longer than a length of the respective trailing arm in the vehicle lateral direction.

3. The trailing arm type suspension according to claim 2, wherein each of a pair of right and left side members of the vehicle body frame has a kick up part disposed so as to rise toward a rearward end of the vehicle, the right and the left side members being disposed under a floor so as to extend along the vehicle longitudinal direction;

on the at least one of the left and right sides of the fuel tank, a connecting part is provided in a lower end portion of the respective kick up part, a front end portion of the reinforcing bar is connected to the connecting part and the front end portion of the reinforcing bar is disposed forwardly of a front end portion of the respective trailing arm;

the reinforcing bar is set in a substantially horizontal posture along the vehicle longitudinal direction; and on the at least one of the left and right sides of the fuel tank, a rear end portion of the reinforcing bar is attached to a lower end portion of a mounting bolt for mounting the suspension member to the respective side member in the vertical direction.

4. The trailing arm type suspension according to claim 3, wherein a rubber bush is pressed into a vertical hole formed in the suspension member, the rubber bush including an internal cylinder and an elastic body formed of rubber which is vulcanized and adhered to an outer peripheral surface of the internal cylinder; and on the at least one of the left and right sides of the fuel tank, the respective side member, the internal cylinder, and the rear end portion of the reinforcing bar are connected to one another by the mounting bolt inserted through the internal cylinder, so as to install the rear end portion of the reinforcing bar to the lower end portion of the mounting bolt.

5. The trailing arm type suspension according to claim 4, wherein on the at least one of the left and right sides of the fuel tank, a suspension member mounting bracket extends downwardly from a portion of the respective side member rearward of the respective kick up part; and the suspension member is connected to an underside of the suspension member mounting bracket via the rubber bush.

6. The trailing arm type suspension according to claim 1, wherein a longitudinal intermediate portion of the reinforcing bar is formed of a metallic pipe material, a front end portion and a rear end portion of the reinforcing bar are formed by metallic attachment plates, and both the attachment plates are welded to both end portions of the metallic pipe material individually.

7. The trailing arm type suspension according to claim 1, wherein the reinforcing bar is formed in a chevron shape such that a longitudinal intermediate portion of the reinforcing bar projects laterally outwardly from a central portion of the vehicle.

* * * * *

UNITED STATES PATENT AND TRADEMARK OFFICE
CERTIFICATE OF CORRECTION

PATENT NO.        : 8,286,980 B2
APPLICATION NO.   : 12/748803
DATED             : October 16, 2012
INVENTOR(S)       : Kenichi Onda et al.

It is certified that error appears in the above-identified patent and that said Letters Patent is hereby corrected as shown below:

In the Specification

Column 4, line 42, "a that" should read --a hat--.

Signed and Sealed this
Thirtieth Day of September, 2014

Michelle K. Lee
*Deputy Director of the United States Patent and Trademark Office*